(12) United States Patent
Bejerano et al.

(10) Patent No.: US 8,374,131 B2
(45) Date of Patent: Feb. 12, 2013

(54) FREQUENCY PLANNING METHOD FOR WIRELESS LANS

(75) Inventors: Yigal Bejerano, Springfield, NJ (US); Seung-Jae Han, Basking Ridge, NJ (US); Mark A. Smith, Jersey City, NJ (US)

(73) Assignee: Alcatel Lucent, Paris (FR)

( * ) Notice: Subject to any disclaimer, the term of this patent is extended or adjusted under 35 U.S.C. 154(b) by 1277 days.

(21) Appl. No.: 12/071,864

(22) Filed: Feb. 27, 2008

(65) Prior Publication Data

US 2009/0213801 A1    Aug. 27, 2009

(51) Int. Cl.
*H04W 4/00* (2009.01)

(52) U.S. Cl. ....................................................... 370/329
(58) Field of Classification Search .................. 370/329, 370/330, 331, 332, 351, 338, 341, 343, 344, 370/350, 431, 432, 443, 395.53
See application file for complete search history.

(56) References Cited

U.S. PATENT DOCUMENTS

| | | | |
|---|---|---|---|
| 6,744,743 B2 * | 6/2004 | Walton et al. | 370/318 |
| 7,020,439 B2 * | 3/2006 | Sinivaara et al. | 455/41.2 |
| 7,133,673 B2 * | 11/2006 | Zeira et al. | 455/436 |
| 7,509,129 B2 * | 3/2009 | Sinivaara | 455/453 |
| 7,729,262 B2 * | 6/2010 | Crandall et al. | 370/238 |
| 7,899,396 B2 * | 3/2011 | Meylan et al. | 455/41.2 |

\* cited by examiner

*Primary Examiner* — Chi Pham
*Assistant Examiner* — Alexander O Boakye
(74) *Attorney, Agent, or Firm* — Harness, Dickey & Pierce

(57) ABSTRACT

A method may include allocating channels of a wireless local area network (WLAN) including a plurality of access points to the plurality of access points based on a load of each access point. The load of each access point may include a user load and/or an interference load. The user load may be generated by each user of the access point. The interference load may be based on interference caused by transmissions between the remainder of the plurality of access points and users of the remainder of the plurality of access points.

18 Claims, 5 Drawing Sheets

AP sensing range

AP transmission range

------ 1-zone
— — 2-zone
—·—·— 3-zone
——— 4-zone

FIG. 5

Channel-Allocation-Framework($A, \{Y_a | \alpha \in A\}, F$)
    For every $f \in F$, $A^f = 0$
    While exist un-served APs in $A$ do
        $\alpha$ = Select unserved...AP
        For every $f \in F$ do
            $T_f^0 = \emptyset$
            /* Allocating $Y_a$ slots for AP $\alpha$.
            For every $R \in [1..Y_\alpha]$ do
                $s = 0$
                /* Finding admissible slots for the $R$-zone of $\alpha$.
                Do ( found == False ) do
                    found = True
                    $s = s + 1$
                    /* Checking the first condition.
                    If ($\exists b \in A^f$ s.t. $b \in R$-zone($\alpha$) $\wedge$ $s \in Z_b$) then
                        found = False
                        /* Checking the second condition.
                    Else if ($\exists b \in A^f \wedge R' \in [1..Y_b]$ s.t.
                        $\alpha \in R'$-zone($b$) $\wedge$ $s \in Z_b^{R_f}$) then
                        found = False
                    End if
                Until ( found == True)
                $T_f^R = T_f^{R-1} \cup \{s\}$
            End for
            $T_f = T_f^{Y_\alpha}$
            $M^f = \max_{b \in A^f \cup \{a\}}$ AP_load ($b, \{Z_b\} \cup \{T_f\}$)
        End for
        $f_\alpha = \text{argmin}_{f \in F} \{M^f\}$
        $A^{f_\alpha} = A^{f_\alpha} \cup \{\alpha\}$
        $Z_\alpha = T_f$
        For ($R \in [1..Y_\alpha]$) $Z_c^R = T_f^R$
    End while
    Return $\{ < f, \{A^f\} > | f \in F \}$
end

FREQUENCY PLANNING METHOD FOR WIRELESS LANS

BACKGROUND

A conventional objective of frequency planning in a wireless network is maximizing the network throughput by reducing inter-cell interference. However, the conventional objective of maximizing the network throughput by reducing inter-cell interference is not directly applicable to wireless local area networks (WLANs), e.g., IEEE 802.11 WLANs, because WLANs inherently provide unfair service. For example, users nearer an access point (AP) in conventional WLANs receive significantly higher throughput than users farther from the AP. The phenomenon of unfair service is greatly aggravated in the presence of interference from adjacent cells, which may cause users which are farther from the AP to suffer starvation while users which are nearer to the AP monopolize the resources. Users nearer the AP enjoy higher data transmission rates and users farther from the AP have to use lower data rates. As a result, frequency planning resulting in higher interference may increase the overall network throughput by starving users farther from the AP and servicing only users nearer the AP because servicing only users nearer the AP maximizes the network throughput.

With the rapid growth in the deployment of IEEE 802.11 WLANs, performance enhancement of WLAN networks has been a research issue. Wireless channel allocation to the APs is one issue. Channel allocation, also known as frequency planning, has a relatively great deal of influence on the system performance of wireless networks. In particular, channel allocation is well studied in the context of cellular wireless telephony. Conventional channel allocation methods are more suited to the cellular telephony scenario, rather than to WLANs. Conventional channel allocation techniques that are applicable to cellular telephony may not be directly applied to WLANs due to technology differences.

For example, a number of non-overlapping channels available for the two most widely deployed WLAN standards, i.e., IEEE 802.11b/g, is very limited. In the United States, among 11 available channels, only three are mutually non-interfering. This limited number of channels means that for reasonably sized networks, conventional graph coloring techniques may not provide channel allocations where all of the cells are free from interference by neighboring cells. Further, the spectrum for 802.11 networks is unlicensed and is therefore subject to interference from external sources. In WLANs, each station performs carrier sensing and sends a packet, only if the channel is idle for a certain duration. Consequently, even weak but long-lasting interference may significantly hinder the performance of WLANs. However, for cellular systems where resources are allocated to each mobile via some sort of reservation scheme, weak but long-lasting interference may not significantly hinder performance.

SUMMARY

Example embodiments may provide a frequency planning method and/or a wireless local area network (WLAN) which takes into account interference and/or maintains a minimum level of service for each user.

According to an example embodiment, a method may include allocating channels of a wireless local area network (WLAN) including a plurality of access points to the plurality of access points based on a load of each access point. The load of each access point may include a user load and/or an interference load. The user load may be generated by each user of the access point. The interference load may be based on interference caused by transmissions between the remainder of the plurality of access points and users of the remainder of the plurality of access points.

According to an example embodiment, a WLAN may include a plurality of channels allocated to a plurality of access points. The plurality of channels may be allocated to the plurality of access points based on a load of each access point. The load of each access point may include a user load based on each user of the access point and an interference load based on interference caused by transmissions of the remainder of the plurality of access points and users of the remainder of the plurality of access points.

According to an example embodiment, a method may include providing a wireless local area network (WLAN) including a plurality of access points. The WLAN may be configured to allocate channels to the plurality of access points based on a load of each access point. The load of each access point may include a user load based on each user of the access point and an interference load based on interference caused by transmissions between the remainder of the plurality of access points and users of the remainder of the plurality of access points.

According to an example embodiment, a method may include ensuring a level of service above a threshold level to each user of a wireless local area network (WLAN) including a plurality of access points while maximizing a throughput of the WLAN.

BRIEF DESCRIPTION OF THE DRAWINGS

The above and/or other aspects and advantages will become more apparent and more readily appreciated from the following detailed description of example embodiments taken in conjunction with the accompanying drawings of which:

FIG. 5 illustrates an example pseudo-code for an example formal description of a solution framework for a frequency planning method according to an example embodiment.

DETAILED DESCRIPTION OF EXAMPLE EMBODIMENTS

Figure 1A:
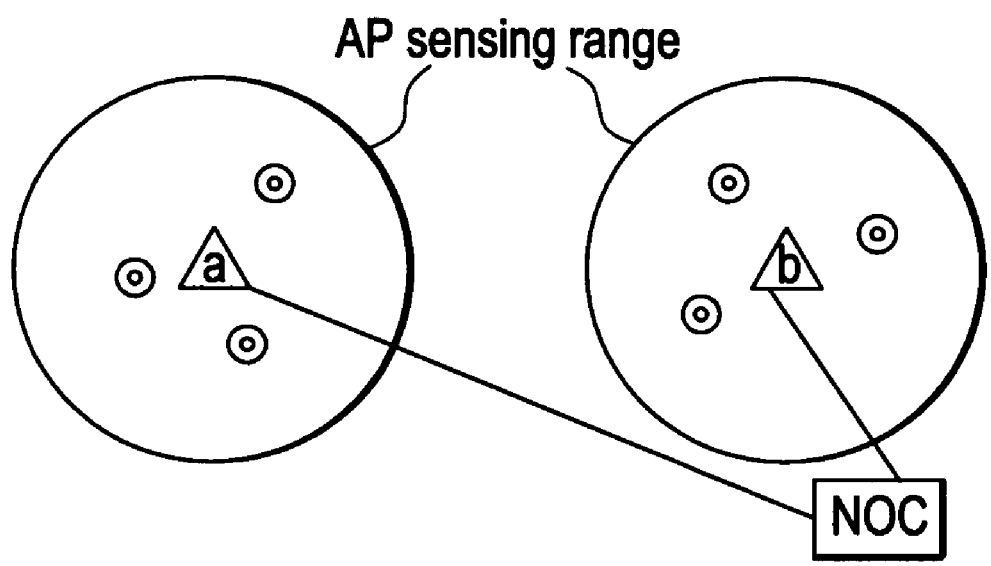
FIG. 1A-1D respectively illustrate example cases of disjoint cells, coupled cells, overlapping cells, and adjacent cells according to an example embodiment.

Example embodiments will now be described more fully hereinafter with reference to the accompanying drawings. Embodiments may, however, be in many different forms and should not be construed as being limited to the example embodiments set forth herein. Rather, these example embodiments are provided so that this disclosure will be thorough and complete, and will fully convey the scope to those skilled in the art.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the example embodiments.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference will now be made to example embodiments, which are illustrated in the accompanying drawings, wherein like reference numerals refer to the like components throughout.

Wireless LANs (WLANs) may exhibit two anomalies. A first anomaly of WLANs may be service unfairness depending on the location of users. It is well known in the art that the IEEE 802.11 MAC protocol exhibits both short term and long term unfairness. For example, if a portion of users are closer to an access point (AP) than other users, the users that are farther from the AP may reduce the total throughput of a cell. A cell may be an area covered by a transmission range of the AP. The total throughput of the cell may be reduced because the farther users communicate at lower bit rates, and therefore, the transmission periods of the packets are longer (in both directions) for the farther users than the nearer users. Therefore, although farther users capture the channel for a longer duration, the farther users may still suffer from significantly lower throughput than the nearer users. The phenomenon where farther users capture the channel for a longer duration while still suffering from significantly lower throughput than the nearer users may be called special unfairness. Special unfairness is an inherent property of WLANs that may be caused by the interaction between the medium access control (MAC) mechanism and a different signal strength that each user receives.

A second anomaly of WLANs may be related to the impact of special unfairness on WLAN frequency planning. Conventional methods assume that frequency planning maximizes the total network throughput by mitigating the interference between adjacent cells. However, total network throughput is not necessarily maximized by mitigating the interference between adjacent cells in WLANs. For example, higher interference between adjacent cells may actually increase the overall system throughput significantly. For example, assuming an example WLAN having two APs and three mobile users, the overall network throughput may increase by more than 50% if the two APs share the same frequency as compared to a case of using distinct non-interfering frequencies because special unfairness may be aggravated in the presence of interference from adjacent cells and/or may cause starvation of the users farther from the APs. The interference from adjacent cells may lower the data rates of users farther from the AP thereby causing frequency planning to increase the overall network throughput by starving these farther users and servicing only the users nearer the AP less affected by the interference. A farther user, which communicates with a lower bit-rate, may be starved, and consequently, the channel may be monopolized by the nearer users for higher bit-rate transmissions. Accordingly, a frequency planning paradox may result. The counter-intuitive phenomenon of the frequency planning paradox may suggest that a conventional mind-set of using network throughput as a measure of the effectiveness of frequency planning is not adequate for WLANs, e.g., IEEE WLANs. For example, frequency planning should not cause the starvation of some users, even if the starvation increases the total network throughput.

Service unfairness and user starvation occur relatively frequently in WLANs, e.g., in WLANs in enterprises, cites and residential environments. As WLANs carry larger amounts of bandwidth and time sensitive traffic, e.g., video and voice traffic, the problems of service unfairness and user starvation may become more evident. Although frequency planning alone may not eliminate the special unfairness inherent in WLANs, e.g., in IEEE 802.11 MAC protocol, example embodiments may include a frequency planning method mitigating interference and/or enhancing service fairness. Because only a few non-interfering channels are available in WLANs, e.g., IEEE 802.11 b/g WLANs, non-interfering channels may not always be assigned to all adjacent APs. Frequency planning according to example embodiments may employ a mathematical model that quantitatively captures and/or takes into account the amount of interference between adjacent cells. For example, an AP load for a particular AP may include two components, a load generated by the users associated with the particular access point, called user load, and a load generated by interference from adjacent APs that share the same channel, called interference-load.

A wireless LAN may include a set of APs denoted by A. The APs may be attached to a fixed infrastructure that provides connectivity to wired networks. The WLAN may utilize |F| non-interfering wireless channels, denoted by $F=\{f_1, \ldots, f_{|F|}\}$. Each AP may be assigned a channel $f \in F$ that is used to serve users within a transmission range of the AP. Each station, i.e., either an AP or a user, may be associated with a sensing range, in which a transmission of the station may be sensed by others. A sensing range of a station may be larger than a transmission range of the station.

Users may be assumed to have a quasi-static mobility pattern. For example, users may be free to move, but users may tend to stay in the same locations for relatively longer durations. Each user in the WLAN may be associated with a single AP. Users under the same AP may transmit at different bit rates, depending on the channel conditions for the respective users. Because the same wireless channel may be shared by all of the users associated with a given AP, each user u may contribute a certain amount of load on to a serving AP a, which is denoted by $y_{a,u}$. A channel condition between an AP and a user may be time-varying and/or the data flows may have relatively 'bursty' characteristics. Therefore, each user's load to a corresponding serving AP may be time-varying. Frequency planning according to an example embodiment may consider an average long-term load rather than short-term load fluctuations.

According to an example embodiment, a network operation center (NOC) may perform frequency planning if the users are substantially uniformly distributed in each cell. The NOC may be an external server configured to manage the network. Alternatively, the NOC may be implemented in an AP. For example, knowledge on the exact location of each user need not be required for frequency planning according to example embodiments. Example embodiments may employ frequency planning with or without activating request-to-send/clear-to-send (RTS/CTS) frame handshakes. Table 1 summarizes notation used regularly throughout the disclosure.

| Symbol | Semantics |
| --- | --- |
| A | The set of all access points (APs). |
| $U_a$ | The set of users associated with AP a. |
| F | The set of permitted non-interfering channels. |
| $y_{a,u}$ | The load on AP a generated by user u. |
| $Y_a$ | The user-load of an AP a. |
| $Q_a$ | The interference load of AP a. |
| $L_a$ | The load on AP a. |
| $\hat{L}$ | The network congestion load. |
| $\alpha_{a,b}$ | The interference-coefficient between AP a and b. |
| R | The number of slots required for an R-zone. |

Example embodiments may provide a method of frequency planning which ensures a minimal level of service to the users regardless of the locations of the users, while maximizing the network throughput. Contrary to conventional methods, which assume optimal frequency planning without inter-AP interference, example embodiments may model interference between adjacent APs in the calculation of the load of the APs.

The load of an AP may reflect an ability of the AP to satisfy the resource requirements of users associated with the AP. Therefore, the load on an access point may be inversely proportional to the average bandwidth that the users receive. The load on an AP a, denoted as $L_a$, may be defined as a time required by AP a to process (send or receive) one unit of traffic or data (e.g., one or more packets) for each of the users associated with AP a. If each user u of AP a generates the individual load $y_{a,u}$, the user-load of AP a, denoted by $Y_a$, may be defined as the sum of the individual load contributions. For example, $Y_a$ may be defined according to the following equation:

$$Y_a = \Sigma u \epsilon U_a y_{a,u} \quad (1)$$

where $U_a$ is the set of users associated with AP a. The linear summation of equation (1) is possible because at any given time an AP may serve at most one user.

An impact of interference by neighboring cells may be modeled based on interference-load. An interference-load of AP a, denoted by $Q_a$, may indicate an additional load on AP a caused by the transmissions at adjacent cells. Interference may be converted to load because while the user-load of an AP indicates the overall time that is required to service all of the users associated with an AP, the interference-load of an AP may represent a portion of time that the AP may not use an assigned channel for useful transmission due to interference. The additional load may be substantially the result of transmissions at adjacent cells, which prohibit the communication of the AP with associated users. The interference load may consider the busy channel status due to transmission at the adjacent cells and/or packet retransmission due to interference. A load of any AP a may be defined according to the following equation:

$$L_a = Y_a + Q_a \quad (2)$$

where $Y_a$ is a static component of the AP load, independent of frequency planning, and Qa is a dynamic component of the AP load, which depends on the frequency planning.

FIGS. 1A-1D illustrate example cases of interference load. The example cases may assume that the transmission range of a station equals a sensing range of the station, however, example embodiments are not limited thereto and the transmission range of a station need not equal a sensing range of the station.

Referring to FIGS. 1A-1D, a WLAN may include 2 APs a and b that share the same channel (i.e., frequency). An NOC may be included in one of the APs a and b. Alternatively, the NOC may be located external to the APs a and b, e.g., as illustrated in FIGS. 1A-1D. The user-loads of the 2 APs a and b are denoted by $Y_a$ and $Y_b$. FIGS. 1A-1D represent different interference types between the APs a and b.

FIG. 1A represents an example case of disjoint cells, i.e., the APs are far enough away from each other that the transmissions at one cell do not interfere with the transmissions at the other cell. Accordingly, the interference-load of both APs may be zero and the AP load may include only the user-load, i.e., $L_a = Y_a$ and $L_b = Y_b$.

Figure 1B:
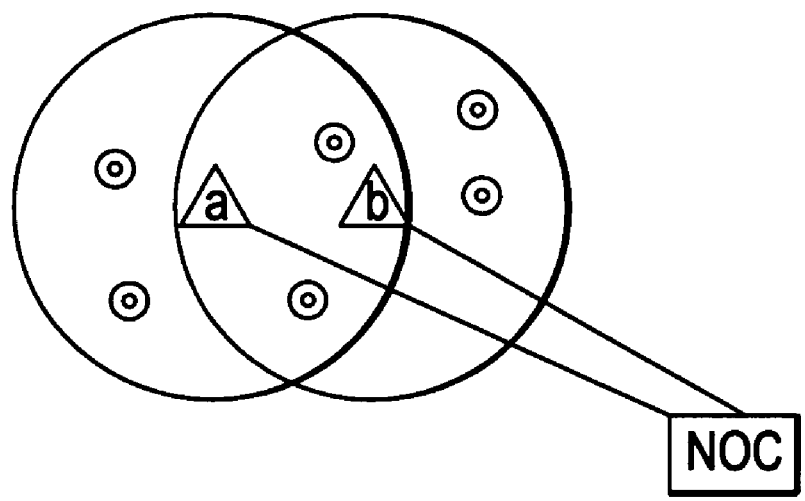

FIG. 1B represents an example case of coupled cells, i.e., two APs are relatively closer and each AP is within the sensing range of the other. Accordingly, at any given time only one AP may capture the channel because any communication in one cell may prevent communication in the other cell. The load of each AP becomes a sum of the user-load of both APs, i.e., $L_a = L_b = Y_a + Y_b$.

Figure 1C:
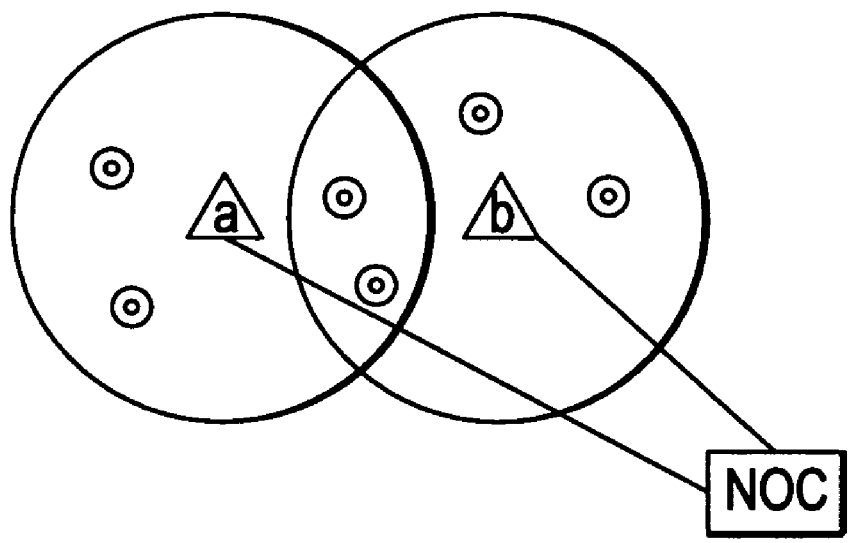

FIG. 1C represents an example case of overlapping cells, i.e., the cell coverage of the APs partially overlap with each other, but the APs themselves are not within the sensing range of each other. Accordingly, both APs may simultaneously communicate with certain users without interference. However, if an AP communicates with users at the overlapping regions, the AP will cause interference to the other cell. The load of each AP is more than the user-load of the AP alone, but is less than the sum of the user-loads of both APs, i.e., $Y_a < L_a < Y_a + Y_b$ while $Y_b < L_b < Y_a + Y_b$.

Figure 1D:
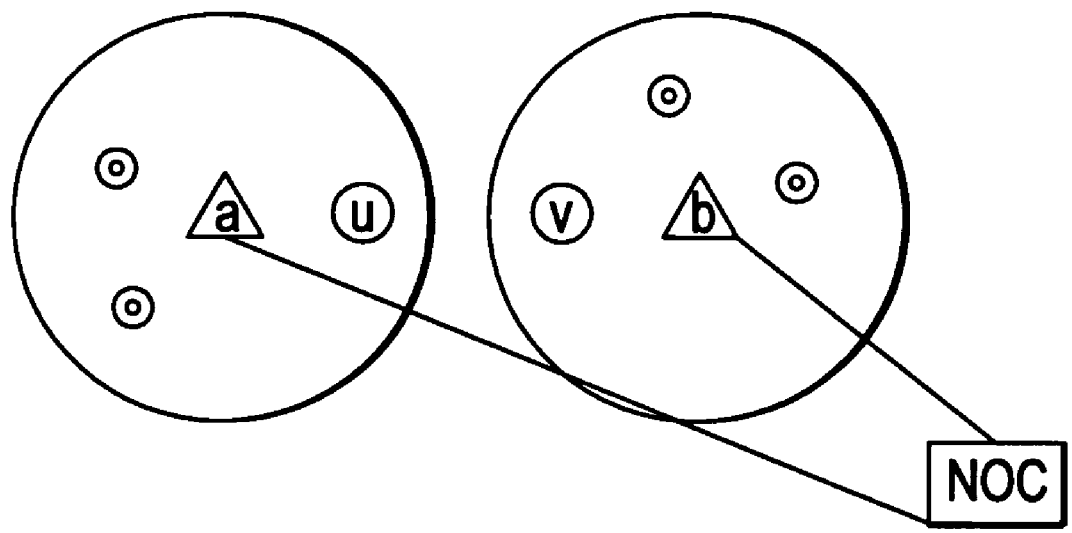

FIG. 1D represents an example case of adjacent cells, i.e., the APs have disjoint cell coverage, but the APs are close enough for some transmissions in one cell to interfere with the transmissions in other cell. For example, a transmission for user u to AP a may interfere with the communication between AP b and user v. Accordingly, the interference-load that an AP, e.g., AP a, imposes on an adjacent AP(s) may depend on the distance between the APs as well as the communication activity at the cell of AP a.

An interference-load that AP a contributes to the load of AP b may be a product of the user-load of AP a, $Y_a$, and an interference coefficient, $\alpha_{b,a}$ may specify a portion of communication activity of AP a that interferes with the activity of AP b. The loads of AP a and AP b may be respectively defined by the following equations:

$$L_a = Y_a + \alpha_{a,b} \cdot Y_b \quad (3)$$

$$L_b = Y_b + \alpha_{b,a} \cdot Y_a \quad (4)$$

The users may be assumed to be uniformly distributed in each cell, so that the interference-coefficients depend only on the geometric placement of the APs. However, if locations of the users in a cell are known, more accurate calculation of the interference-load may be possible.

The interference coefficients may depend on deployment aspects that impact the signal attenuation, e.g., the distance between the APs and the obstacles between the APs. The interference coefficient $\alpha_{a,b}$ may be defined according to the following equation:

$$\alpha_{a,b} = \begin{cases} 1 & \text{if } d(a,b) \le sr, \\ 0 & \text{if } d(a,b) \ge 2tr + sr, \\ \left(1 - \dfrac{d(a,b) - sr}{2tr}\right) K & \text{otherwise.} \end{cases} \quad (5)$$

where a and b are two adjacent APs with distance d(a, b) from each other; K is a constant; tr is the transmission range; and sr is the sensing range of each AP. The above definition of the interference coefficient $\alpha_{a,b}$ may assume symmetric signal attenuation in all directions. Accordingly, equation (5) may separate the four example cases described above with reference to FIGS. 1A-1D. If d(a, b) is less than or equal to sr the APs may sense each others transmission, e.g., the two cells may be coupled as in FIG. 1B such that $\alpha_{a,b}=1$. A maximum distance where the actions of two APs may affect each other may occur if a user at the end of each AP's transmission range senses the other. Therefore, if d(a, b)>2tr+sr, the cells may be disjoint as in FIG. 1A such that $\alpha_{a,b}=0$. Between the above two cases of coupled and disjoint cells, $\alpha_{a,b}$ may be defined as a decreasing concave function, such that $\alpha_{a,b}(sr)=1$ and $\alpha_{a,b}(sr+2tr)=0$. For example, for d(a,b)∈[sr,sr+2tr] and K=2, as d(a, b) is increased, $\alpha_{a,b}$ decreases at a rate that is proportional to the reduction of the area of the overlapping sensing ranges.

Figure 2:
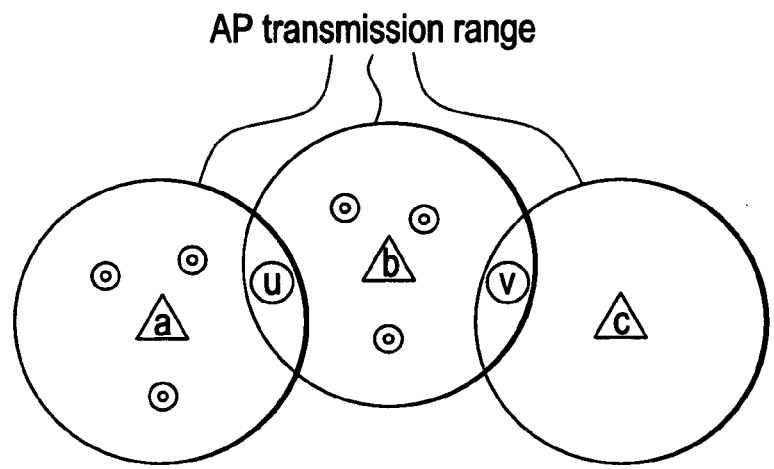
FIG. 2 illustrates an example of a WLAN including three access points (APs) according to an example embodiment.

FIG. 2 illustrates an example of a WLAN with three APs a, b, and c. Both AP a and AP c may interfere with the communication of AP b. For example, the communication in the cell of AP b may be affected, i.e., silenced, if AP a communicates with user u or AP c communicates with user v. Because the access behavior in each cell is not coordinated, the a-u communication may occur simultaneously or may be disjoint with the b-v communication. Therefore, the interference load of AP b may be bounded between the following two extreme cases.

In one extreme case, the interfering transmissions may occur at different time periods. Therefore, the APs a and c may be said to generate a sequential interference load of AP b that is the aggregation of the interference contributions of the APs a and c, i.e., $\alpha_{b,a} \cdot Y_a + \alpha_{b,c} \cdot Y_c$. In the other extreme case, the interfering transmissions may occur simultaneously. Therefore, the APs a and c may be said to yield concurrent interference load that is the maximum among the two individual interference-loads, i.e., max $\{\alpha_{b,a} \cdot Y_a + \alpha_{b,c} \cdot Y_c\}$. Example embodiments may provide a general interference model for a frequency planning method that captures both the concurrent and sequential interference loads.

A maximal AP load, termed the congestion load, for a given channel allocation may be defined. Time may be divided into time slots which are numbered 1, 2, 3, ..., n, where the index of a slot is termed a slot index. An AP may use a certain time slot for communication with the users included in the cell of the AP or the cell of the AP may be silent during the time slot due to interference by other cells. The load on each AP may be represented by the slots that are allocated for serving the AP's user-load, while considering the interference from adjacent cells.

Inter-AP interference may be captured by the concept of R-Zone. Under the R-Zone concept, $\lceil Y_a \rceil$ regions, which are enumerated from 1 to $\lceil Y_a \rceil$, may be formed for each AP a. Each region is termed as R-Zone, R∈[1 ... $\lceil Y_a \rceil$]. $A^f$ may denote all of the APs that use the channel f∈F, and $Y_a$ may denote the user load of the AP a. The R-Zone may include all APs in $A^f$ that experience interference load of R or more, caused by AP a, e.g., the R-Zone contains AP b∈$A^f$ such that $\lceil \alpha_{a,b} \cdot Y_a \rceil \ge R$. Accordingly, if AP b∈$A^f$ is included in the R-Zone of AP a, AP b∈$A^f$ is included in the R'-Zone of AP a for any R'<R. Therefore, any R-Zone of AP a may be subsumed in any R'-zone of AP a where R'<R. Accordingly, the R-zones of an AP a may be viewed as a set of $\lceil Y_a \rceil$ concentric circles centered at the location of AP a, such that the radiuses of the concentric circles decrease as the R-index increases.

Figure 3:
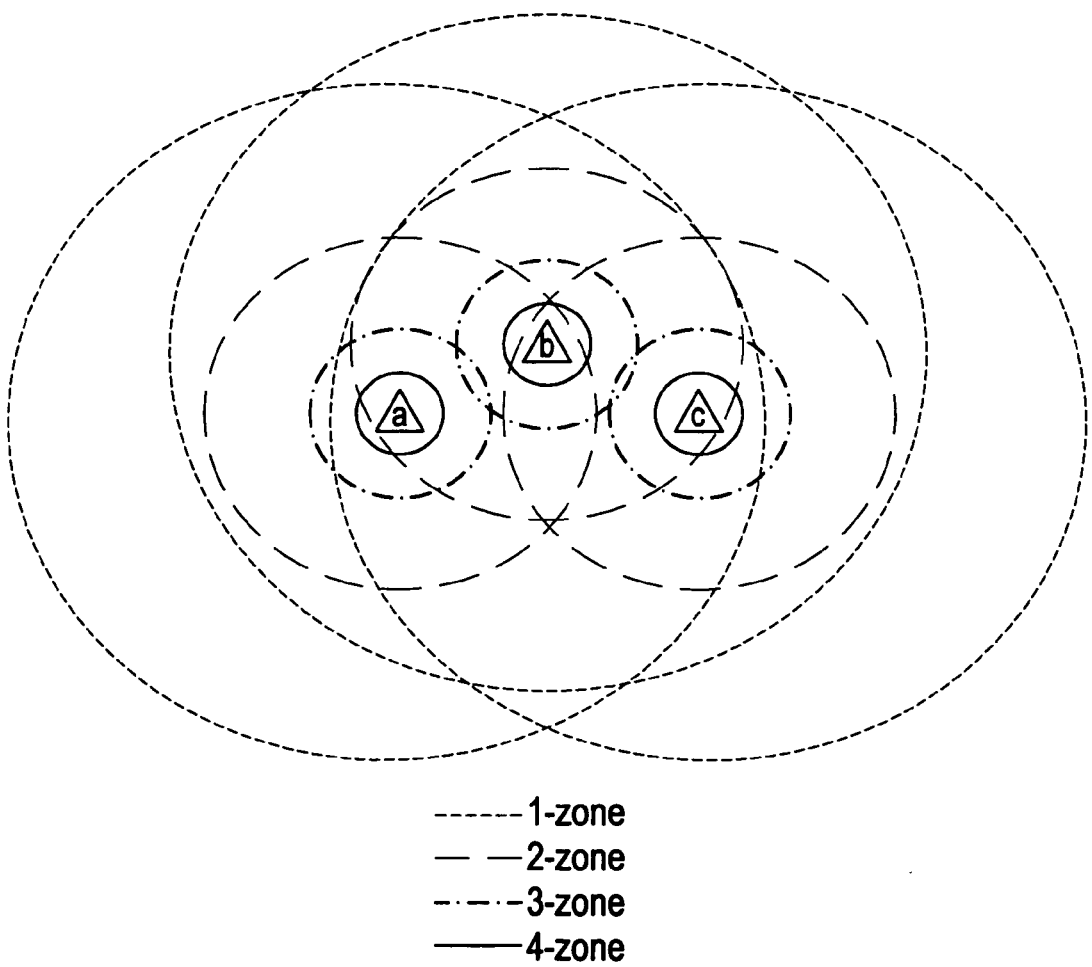
FIG. 3 illustrates a WLAN including APs a, b, and c and an example configuration of respective R-zones as concentric circles centered about APs a, b, and c.

FIG. 3 illustrates a WLAN including APs a, b, and c and an example configuration of respective R-zones as concentric circles centered at APs a, b, and c. AP $\bar{b}$ is included 2-zone of APs a and c, AP a is included in the 2-zone of AP b and the 1-zone of AP c, and AP c is included in the 2-zone of AP b and the 1-zone of AP a in the example configuration of FIG. 3.

Figure 4:
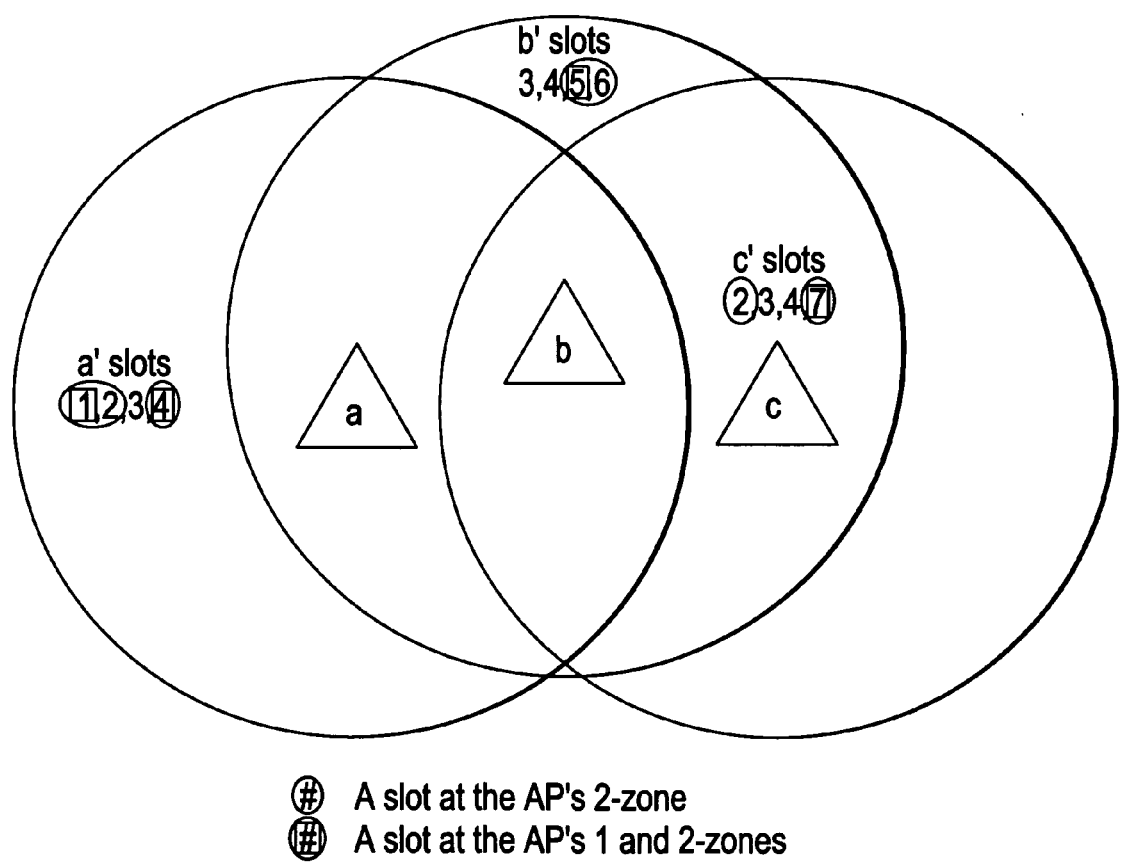
FIG. 4 illustrates an example slot allocation for a WLAN including three APs according to an example embodiment.

FIG. 4 illustrates an example slot allocation for a WLAN including three APs according to an example embodiment.

Referring to FIG. 4, a WLAN may include three APs a, b, and c. If each of the APs a, b, and c have a user load $Y_a = Y_b = Y_c = 4$ and an interference coefficient of AP b on the neighboring APs is 0.5, i.e., $\alpha_{a,b} = \alpha_{c,b} = \alpha_{b,a} = \alpha_{b,c} = 0.5$ while $\alpha_{a,c} = \alpha_{c,a} = 0.25$, APs a and c may be included in the 2-zone of AP b, and AP b may be included in the 2-zone of APs a and c. However, APs a and c may not be included in the 2-zone of each other. In addition, each of the three APs a, b, and c may be included in the 1-zones of the other APs.

Each AP may have an allocation constraint that requires at least R time slots that are not allocated to the other APs of the AP's R-zone. In other words, every R-zone may need to be associated with R time slots that are not used by any other AP in that zone. The R time slots for the R-zone may subsume the slots associated with each R'-zone for any R'<R. A feasible slot allocation is a slot allocation where $\lceil Y_a \rceil$ slots are allocated to each AP a, while preserving the allocation constraints of each AP.

An interference slot of AP a may be any slot associated with the R-zone of an AP b that subsumes AP a. For example, for concurrent interference, the same interference slots are allocated to several obstructing APs, and therefore, the interference load of AP a, i.e., $Q_a$, may be the total number of the interference slots for AP a.

The load of an AP may be the aggregation of the user load Ya of the AP and the interference load Qa of the AP, i.e., $L_a = Y_a + Q_a$. A congestion load may be defined as the maximal AP load.

FIG. 4 illustrates an example feasible slot allocation assuming that all of the APs a, b, and c use the same channel. The slots 1-4 may be allocated to AP a, where slot 1 is associated with the 1-zone of AP a and slots 1, 2 are associated with the 2-zone of AP a. The slots 3-6 may be allocated to AP b because AP b is included in the 2-zone of AP a. The slots 5, 6 may be associated with the 2-zone of AP b. AP c may be included in the 1-zone of AP a, and therefore, the slot with index 1 may not be allocated to AP c. AP c may be in the 2-zone of AP b, and therefore, AP b may not be associated with slots 5, 6. Accordingly, slots 2, 3, 4 and 7 may be allocated to AP c. The 1-zone of AP c may be associated with slot 7, while the 2-zone of AP c may be associated with slots 2, 7. A total of 7 slots are used for the example slot allocation illustrated in FIG. 4, which is the load of the APs. The slot allocation illustrated in FIG. 4 is the optimal slot allocation.

Accordingly, example embodiments may capture both sequential and concurrent interference types. Referring to FIG. 4, the slots that are identified as interfering with AP b are 1, 2 and 7, and slots 1, 2, and 7 are associated with the 2-zone of APs a and c. The slots 1 and 7 correspond to the sequential interference, while the slot 2 corresponds to the concurrent interference. For a WLAN with multiple APs that support $|F|$ non-interfering wireless channels, $F=\{f_1, \ldots, f_{|F|}\}$. Each AP a may experience a user-load of $Y_a$ and may be associated with $\lceil Y_a \rceil$ different R-zones. A frequency planning method according to an example embodiment may find a channel allocation that reduces and/or minimizes the congestion load, $\tilde{L}$.

A channel allocation problem for minimizing the congestion load may not be solved in polynomial time (the channel allocation problem known to be NP hard based on a simple reduction from a graph coloring problem) and may be based on a simple reduction from a graph coloring problem.

Finding an approximate solution for the graph coloring problem is known as a hard problem, i.e., the problem cannot be approximated within $|V|_{1-\epsilon}$ for any $\epsilon>0$, unless $Z_{pp}$=NP. Therefore, although algorithms according to an example embodiment may be used for more general graphs, example embodiments may be applied to a case where the interference-coefficient, $\alpha_{b,a}$, between any AP-pair a and b is a monotonic non-increasing function of the distance between the two APs. Accordingly, the R-zones of the APs may be circular and geometric properties for guaranteeing a solution quality may be used.

Frequency planning according to an example embodiments may include an iterative solution framework that guarantees the 7-approximation ratio. $A^f$ may be the set of 'served' APs that are already assigned to the channel f∈F. A frequency planning method according to an example embodiment may iteratively select an 'un-served' AP a according to a certain criteria. For each channel f∈F, the $Y_a$ time-slots with lowest indexes that may be allocated to AP a for serving the users of AP a, without violating the allocation constraints posed by the APs in $A^f$ may be found. AP a may be associated with the channel f that minimizes the congestion load of the set $A^f \cup \{a\}$.

An iterative algorithm for finding the $Y_a$ admissible slot allocation to AP a at any given channel f∈F for a frequency planning method according to an example embodiment is described in detail below. At each iteration R, (e.g., for each of the R-zones of an AP a), the algorithm may use a first-fit approach for selecting a single admissible slot to associate the R-zone of AP a. Therefore, the slots associated with the R-zone of AP a may be all slots selected in the first R iterations. Because the selected slots must satisfy the allocation constraints posed by the APs in $A^f$, the slot selected at the R-th iteration must satisfy two conditions. A first condition may be that the slot-index is not allocated to any AP b∈$A^f$ that is included in the R-zone of AP a, and a second condition may be that the slot-index is not associated with the R'-zone of any AP b∈$A^f$ such that AP a is included in the R'-zone of the AP b∈$A^f$. Accordingly, at each iteration R, the algorithm may start with the lowest slot index, i.e., 1, and increase the slot index until the algorithm finds an admissible slot that satisfies the first and second conditions. A slot satisfying the first and second conditions may be associated with the R-zone of AP a FIG. 5 illustrates an example pseudo-code for an example formal description of the solution framework for a frequency planning method according to an example embodiment. R-zone(a) denotes the set of APs in the R-zone of AP a, and s is a an increasing slot index used for identifying admissible slots. $Z_b^R(Z_b)$ denotes the slot indexes allocated to the R-zone of AP b. $T_f^R(T_f)$ denotes the temporary slots allocated to the R-zone of AP a during the evaluation of channel f. Assuming that AP a is temporarily associated with the frequency f and that $\{Z_b\} \cup \{T_f\}$ denotes the current slot assignment of all the APs b∈$A_f$ including a. The function APload(b,$\{Z_b\} \cup \{T_f\}$) calculates the load of AP b∈$A_f$ under the above assumption as defined by $L_a = Y_a + Q_a$. $M^f$ denotes the current congestion load of all the APs $A^f \cup \{a\}$ associated with frequency f.

A selection order of the APs for the iterative algorithm included in a frequency planning method according to an example embodiment may be selected by an expected-load selection method. The expected-load selection method may sort the APs according to an expected load of the APs. For each AP a an expected load may be evaluated according to the following equation:

$$EL_a = S(a,A)/|F| + Y_a \quad (6)$$

and the APs may be selected according to a decreasing order of the expected loads of the APs. Remember, F is the set of permitted non-interfering channels, and S(a, X) denotes the aggregated interference-load on AP a posed by the APs in X and may be defined by the following equation:

$$S(a, X) = \sum_{b \in X} \lceil \alpha_{a,b} \cdot Y_b \rceil \quad (7)$$

Accordingly, example embodiments may eliminate interference from APs that have higher load by reducing the number of neighbors with whom the APs having the higher load share the same channel.

For example, referring to the WLAN including the three APs a, b, and c in FIG. 4, for a channel allocation where $F=\{f_1, f_2\}$ contains only two channels and the expected load of the APs a, b and c are 5.5, 6, and 5.5, respectively, AP b is assigned to channel $f_1$ with AP load $L_b=4$ while APs a and c are associated with channel $f_2$ with load $L_a=L_c=5$.

Accordingly, for any feasible solution of the iterative algorithm of the frequency planning method according to an example embodiment, a slot with index $S(a, A_a^f)$ or higher is allocated to one of the APs in $A_a^f$, i.e., at least $S(a, A_a^f)$ different slots are allocated to the APs in $A_a^f$. For any sector of AP a, at any feasible solution of the iterative algorithm of the frequency planning method according to an example embodiment, at least $S(a, A_a)$ different slots are allocated to the APs in $A_a$. Any slot allocation must use a slot with index $U/(6-|F|)$ or higher. Accordingly, the channel allocation frame work of a frequency planning method according to an example embodiment may have an approximation ratio of 7.

Accordingly, a frequency planning method according to example embodiments may enhance a fairness of resource allocation to users. As such, users with poorer channel conditions may be guaranteed to receive service comparable to a case where the cell of the user does not suffer from external interferences. A frequency planning method according to an example embodiment may extend the definition of AP load by taking into account interference.

Although example embodiments have been shown and described in this specification and figures, it would be appreciated by those skilled in the art that changes may be made to the illustrated and/or described example embodiments without departing from their principles and spirit.

What is claimed:

1. A method comprising: allocating, by a computer, channels of a wireless local area network (WLAN) including a plurality of access points to the plurality of access points based on a load of each access point, the load of each access point including a user load based on each user of the access point and an interference load based on interference caused by transmissions between a remainder of the plurality of access points and users of the remainder of the plurality of access points, and the allocating further creating, for each access point of the plurality of access points, a number of regions based on the user load of the access point.

2. The method of claim 1, wherein the allocating the channels of the WLAN is based on a time required to send one unit of data to each user in the WLAN.

3. The method of claim 1, wherein the creating for each access point of the plurality of access points the number of regions includes locating a selected access point in a given region of another access point if an interference coefficient between the selected access point and the another access point multiplied by the user load of the selected access point is greater than zero and less than or equal to the user load of the selected access point in the given region.

4. The method of claim 3, further comprising: calculating the interference coefficient based on a channel quality condition between the selected access point and the another access point, the channel quality condition based on at least one of a distance between the selected access point and the another access point and obstacles between the selected access point and the another access point.

5. The method of claim 4, wherein the calculating the interference coefficient between the selected access point and the another access point is calculated in accordance with the following equation:

$$\alpha_{a,b} = \begin{cases} 1 & \text{if } d(a,b) \le sr, \\ 0 & \text{if } d(a,b) \ge 2tr + sr, \\ \left(1 - \dfrac{d(a,b) - sr}{2tr}\right)K & \text{otherwise.} \end{cases}$$

wherein d(a, b) is the distance between the selected access point and the another access point, tr is a transmission range of the selected access point and the another access point, sr is a sensing range of the selected access point and the another access point, and K is a constant.

6. The method of claim 3, wherein the allocating the channels of the WLAN comprises:
finding a number of time slots with lowest indexes for each region of the selected access point which are not assigned to access points in the region of the selected access point for each of the plurality of channels, the number of the time slots for each region based on a user load of the region, and allocating a channel resulting in a lowest congestion load of the WLAN to the selected access point, the congestion load of the WLAN a summation of the loads of each of the access points in the WLAN.

7. The method of claim 6, wherein the allocating the channels of the WLAN includes finding the number of time slots with lowest indexes and allocating the channel resulting in the lowest congestion load of the WLAN for each of the plurality of access points, wherein the selected access point is selected according to a decreasing order of expected loads of the plurality of access points.

8. The method of claim 7, further comprising: calculating the interference coefficient based on at least one of a distance between the selected access point and the another access point and obstacles between the selected access point and the another access point.

9. The method of claim 8, wherein the calculating the interference coefficient between the selected access point and the another access point is calculated in accordance with the following equation:

$$\alpha_{a,b} = \begin{cases} 1 & \text{if } d(a,b) \le sr, \\ 0 & \text{if } d(a,b) \ge 2tr + sr, \\ \left(1 - \dfrac{d(a,b) - sr}{2tr}\right)K & \text{otherwise.} \end{cases}$$

wherein d(a, b) is the distance between the selected access point and the another access point, tr is a transmission range of the selected access point and the another access point, sr is a sensing range of the selected access point and the another access point, and K is a constant.

10. The method of claim 1, wherein the WLAN is any IEEE 802.11 WLAN.

11. The method of claim 1, wherein the allocating the channels of the WLAN is not based on information received from the users.

12. The method of claim 1, wherein different types of interference cause different amounts of interference load.

13. The method of claim 1, wherein the load of each access point is an average load over a period of time.

14. The method of claim 1, wherein the allocating the channels of the WLAN includes allocating a channel resulting in a lowest congestion load of the WLAN to each of the access points, the congestion load of the WLAN a summation of the loads of each of the access points in the WLAN.

15. The method of claim 14, wherein
the allocating the channel resulting in the lowest congestion load of the WLAN to each of the access points includes selecting a selected access point from the plurality of access points according to a decreasing order of expected loads of the plurality of access points and allocating the channel resulting in the lowest congestion load of the WLAN to a currently selected access point based on a channel allocation of previously selected access points.

16. A wireless local area network (WLAN), comprising:
a plurality of channels allocated, by a computer, to a plurality of access points, the plurality of channels allocated to the plurality of access points based on a load of each access point, the load of each access point including a user load based on each user of the access point and an interference load based on interference caused by transmissions of the remainder of the plurality of access points and users of a remainder of the plurality of access points, and the plurality of access points each having a number of regions, the number of regions based on the user load of the access point.

17. A method comprising: providing a wireless local area network (WLAN) including a plurality of access points, the WLAN configured to allocate channels, by a computer, to the plurality of access points based on a load of each access point, the load of each access point including a user load based on each user of the access point and an interference load based on interference caused by transmissions between the remainder of the plurality of access points and users of the remainder of the plurality of access points, and create for each access point of the plurality of access points, a number of regions based on the user load of the access point.

18. A method comprising: ensuring a level of service above a threshold level to each users of a wireless local area network (WLAN) including a plurality of access points while maximizing a throughput of the WLAN by allocating channels, by a computer, of the WLAN to the users based on a load of each access point of the plurality of access points, the load of each access point including a user load based on each of the users of the access point, and creating for each access point, a number of regions based on the user load of the access point.

* * * * *